United States Patent [19]

Takahashi et al.

[11] Patent Number: 5,000,559
[45] Date of Patent: Mar. 19, 1991

[54] OPHTHALMIC LENSES HAVING PROGRESSIVELY VARIABLE REFRACTING POWER

[75] Inventors: Fumio Takahashi, Tone; Yasunori Ueno, Kawasaki; Ryuji Aizawa, Tokyo, all of Japan

[73] Assignee: Nikon Corporation, Tokyo, Japan

[21] Appl. No.: 313,892

[22] Filed: Feb. 23, 1989

[30] Foreign Application Priority Data

Feb. 29, 1988 [JP] Japan .................................. 63-47028
Feb. 29, 1988 [JP] Japan .................................. 63-47030
Feb. 29, 1988 [JP] Japan .................................. 63-47031

[51] Int. Cl.$^5$ .............................................. G02C 7/06
[52] U.S. Cl. .................................................... 351/169
[58] Field of Search ................................. 351/168–172

[56] References Cited

U.S. PATENT DOCUMENTS

3,687,528  8/1972  Maitenaz .............................. 351/169
3,910,691 10/1975  Maitenaz .............................. 351/169
4,537,479  8/1985  Shinohara et al. .................. 351/169

FOREIGN PATENT DOCUMENTS

49-3595   1/1974  Japan .
52-20271  6/1977  Japan .
59-42285 10/1984  Japan .

OTHER PUBLICATIONS

Optica Acta, International Journal of Optics, vol. 10, No. 3, pp. 223–227.

Primary Examiner—Scott J. Sugarman
Attorney, Agent, or Firm—Shapiro and Shapiro

[57] ABSTRACT

Ophthalmic lenses having progressively variable refracting power are designed to have good aberrational balance, a wide field of view, large clear vision areas, and minimal image distortion and shift. Aberration density is reduced in a progressively variable refracting power area in a side portion of the principal meridional curve from a lower position in a portion for distance vision correction, through an intermediate portion, to a portion for near vision correction. Optical cross-sectional and longitudinally sectional shapes of the refracting surfaces optimize aberration balance in the entire area of the refracting surfaces. In the side areas, an average refracting power on the lens surface and a value associated with the Gaussian curvature are used as parameters to define lens aberration quantitatively.

14 Claims, 9 Drawing Sheets

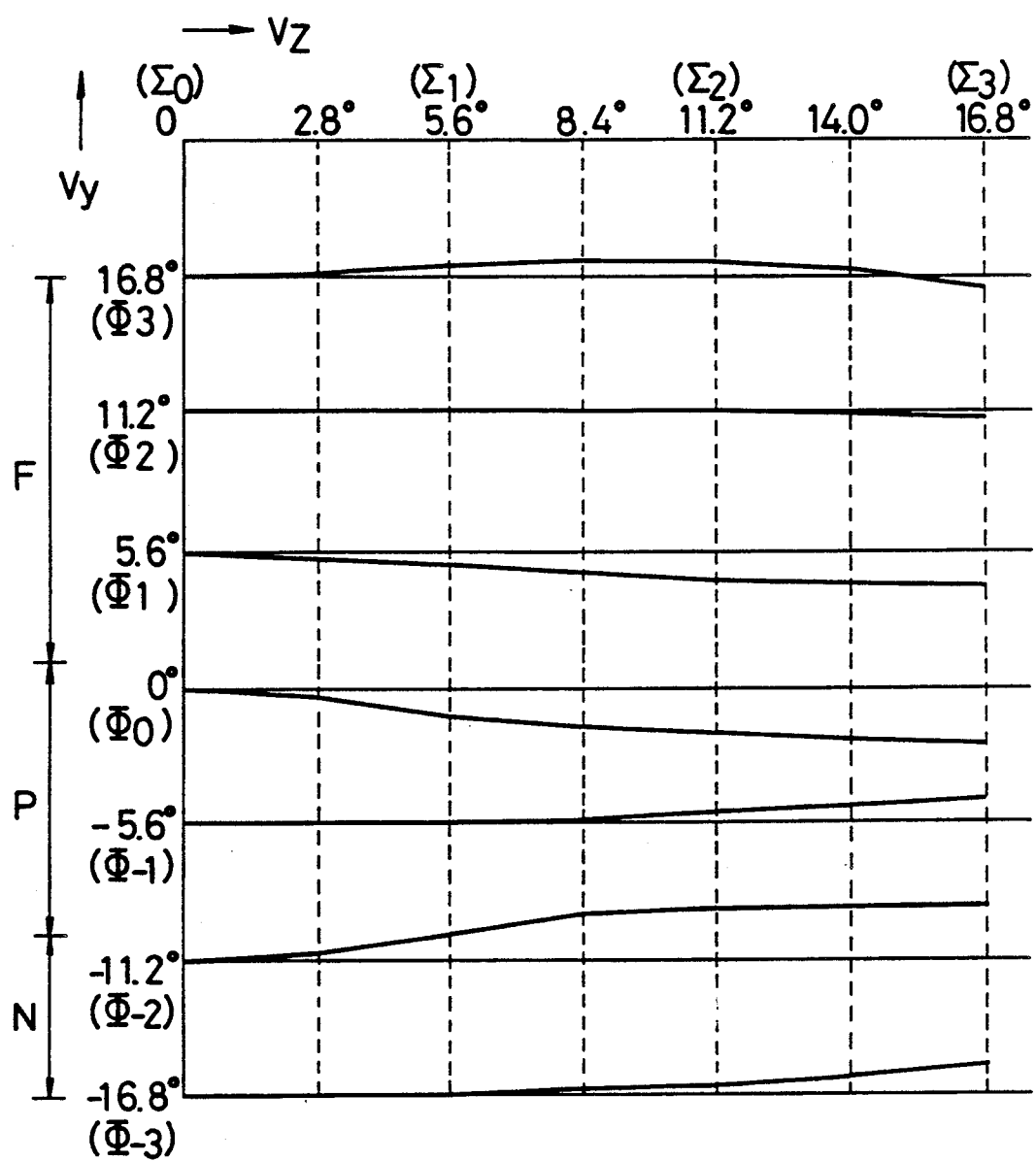

| Z mm / Y mm | 0 | 5 | 10 | 15 | 20 | 25 | 30 | 35 |
|---|---|---|---|---|---|---|---|---|
| 35 | 0.00005 | 0.00126 | | | | | | |
| 30 | 0.00007 | 0.00047 | 0.00103 | | | | | |
| 25 | 0.00111 | 0.00080 | 0.00074 | 0.00152 | | 0.00207 | | |
| 20 | 0.00126 | 0.00011 | 0.00048 | 0.00004 | 0.00036 | 0.00221 | | |
| 15 | 0.00064 | 0.00129 | 0.00164 | 0.00106 | 0.00170 | 0.00313 | 0.00340 | |
| 10 | 0.00010 | 0.00134 | 0.00004 | 0.00091 | 0.00161 | 0.00565 | 0.00775 | 0.02345 |
| 5 | 0.00068 | 0.00193 | 0.00541 | 0.00046 | 0.00527 | 0.01550 | 0.01872 | 0.04098 |
| 0 | 0.00052 | 0.00866 | 0.02230 | 0.00871 | 0.01313 | 0.03095 | 0.03483 | 0.04397 |
| -5 | 0.00110 | 0.02300 | 0.04788 | 0.02381 | 0.02665 | 0.03806 | 0.04100 | |
| -10 | 0.00124 | 0.03021 | 0.07269 | 0.04873 | 0.04191 | 0.03465 | 0.03117 | |
| -15 | 0.00045 | 0.02450 | 0.07687 | 0.07089 | 0.04894 | 0.03119 | 0.02287 | |
| -20 | 0.00184 | 0.00912 | 0.05823 | 0.08578 | 0.05442 | 0.02878 | | |
| -25 | 0.00154 | 0.00346 | 0.04929 | 0.08622 | 0.05338 | 0.03285 | | |
| -30 | 0.00005 | 0.01565 | 0.06916 | 0.08717 | 0.06034 | | | |
| -35 | 0.00230 | 0.01302 | | 0.09839 | | | | |

FIG. 6

OPHTHALMIC LENSES HAVING PROGRESSIVELY VARIABLE REFRACTING POWER

BACKGROUND OF THE INVENTION

1. Field of the Invention

The present invention relates to ophthalmic lenses used to correct an amplitude of accommodation and, more particularly, to ophthalmic lenses having a progressively variable refracting power.

2. Related Background Art

Various types of conventional ophthalmic lenses having a progressively variable refracting power are known as auxiliary ophthalmic lenses for correcting an amplitude of accommodation of an eye when accommodation astheny occurs to fail to observe an object near the eye. An ophthalmic lens of this type has an upper distance vision correction area (to be referred to as a portion for distance vision hereinafter), a lower near vision correction area (to be refereed to as a portion for near vision hereinafter), and a progressively variable refracting power area (to be referred to as an intermediate portion hereinafter) which is defined between the portions for distance vision and near vision and a refracting power of which is continuously changed.

In ophthalmic lenses of this type, wide clear vision areas of the portions for distance vision and near vision are generally assured, and an intermediate progressively variable refracting power area connects these portions. In general, lens aberration is concentrated in side areas of the progressively variable refracting power area. The presence of these areas causes blurring and distortion of an image. Therefore, a user experiences uncomfortable shift of an object when he moves lines of sight.

In order to solve the problems of these visual characteristics, various proposals for design and evaluation have been made regarding the known ophthalmic lenses having a progressively variable refracting power. An intersection line between a cross section along a meridian vertically extending almost the center of a lens surface and an object-side lens surface is used as a reference line of a lens surface shape for an additional power of a lens or the like. In ophthalmic lens design, this intersection line is used as an important reference line. Even in ophthalmic lenses having asymmetrical portions for near vision which are designed in consideration of the fact that the portions for near vision come close to a nose of a user who wears the lenses, a vertical central line extending through the centers of the portions for distance vision and near vision is used as a reference line. According to the present invention, the above-mentioned reference lines are defined as "principal meridional curves".

Conventional ophthalmic lenses having a progressively variable refracting power have a surface shape with a so-called umbilical line in which microscopically spherical surfaces continue along the entire principal meridional curve, and a surface shape which is not umbilical in part of the principal meridional curve, but in which two radii of curvature perpendicular to each other are different in this part of the curve. In other words, surface shapes on the principal meridional curve are classified into two shapes, i.e., a surface shape which is umbilical along the entire principal meridional curve; and a surface shape which is not umbilical on at least part of the principal meridional curve, but in which a radius of curvature along the principal meridional curve (vertical direction) is different from that in a direction (horizontal direction) perpendicular to the principal meridional curve.

According to the law of Minkwitz as in Optica Acta, Vol. 10, No. 3, 1963, July, at least an intermediate portion of the principal meridional curve must not be umbilical. More specifically, according to the law of Minkwitz, an astigmatic difference in the refracting power on the surface of the lens increases at a rate twice a change in refracting power on the surface along the umbilical line in a direction (horizontal direction) perpendicular to the principal meridional curve. It is, therefore, difficult to widen a clear vision area.

Even if the visual characteristics of the intermediate portion are improved to some extent by differentiating the values of the major radii of curvatures perpendicular to each other in the intermediate portion on the principal meridional curve in a conventional technique according to the law of Minkwitz, there are limitations to widening of the clear vision of the portions for distance vision and near vision on the basis of only the law of Minkwitz. In order to minimize an astigmatic difference in the surface, a change in refracting power on the surface must be moderated along a long surface. However, in practice, since the length of the progressively variable refracting power area is limited, the above countermeasure is insufficient.

Various other types of conventional arrangements can assure wide clear vision areas to some extent. However, it is difficult to obtain excellent visual characteristics of all three areas, i.e., the portions for distance vision and near vision and the intermediate portion while a distribution of an astigmatic difference which is inevitably present in the ophthalmic lenses having a progressively variable refracting power is minimized, that is, a maximum value of aberration called astigmatism and its gradient are minimized. It is, therefore, very difficult to realize practically excellent ophthalmic lenses having a progressively variable refracting power by specifying only the state of a change in refracting power along the principal meridional curve. In addition, techniques for improving the visual characteristics are mostly based on trials and errors. A definite design technique is not available, or a definite reference for evaluating lens performance is not established.

Conventional ophthalmic lenses having a progressively variable refracting power are disclosed in Japanese Patent Publication Nos. 49-3595, 52-20271, and 59-42285.

In the above prior-art techniques, it is possible to improve the visual characteristics to some extent, but such an improvement is insufficient in practice. More specifically, in the lens disclosed in Japanese Patent Publication No. 49-3595, as for the shapes of intersection lines formed between a plane perpendicular to the principal meridional curve and lens refracting surfaces as follows, only an intersection line at a point almost corresponding to the center of the intermediate portion has a circular shape. A radius of curvature of the intersection line is reduced in a portion above the center of the intermediate portion as the intersection line is separated from the principal meridional curve, thus constituting a noncircular shape. A radius of curvature of the intersection line is increased in a portion below the center of the intermediate portion as the intersection line is separated from the principal meridional curve, thus constituting a noncircular shape.

In the ophthalmic lenses having a progressively variable refracting power, as disclosed in Japanese Patent Publication No. 49-3595, only the central portion has a circular shape, while other areas have a simple noncircular shape. The clear vision areas (i.e., the range having an astigmatic difference of 0.5 diopter or less) of the portions for distance vision and near vision are narrow. In addition, an abrupt change in aberration also occurs to narrow the field of view and cause distortion and shift of the image.

The technique disclosed in Japanese Patent Publication No. 52-20271 is an improvement of the static visual characteristics disclosed in Japanese Patent Publication No. 49-3595 by adding an improvement of dynamic visual characteristics. The dynamic visual characteristics can be improved to some extent, but cannot reach a sufficiently practical level.

In addition, in the lens disclosed in Japanese Patent Publication No. 59-42285, the shapes of the intersection lines formed by the plane perpendicular to the principal meridional curve and lens refracting surfaces are given as follows. The radius of curvature of the upper position in the portion for distance vision is decreased as the position is separated from the principal meridional curve. A rate of decrease in the radius of curvature becomes almost zero when the position is moved upward in the portion for distance vision. The uppermost position of the portion for distance vision has a predetermined radius of curvature. A lower position in the portion for distance vision has a noncircular shape in which the radius of curvature is monotonously decreased. The intermediate portion has a noncircular shape such that the radius of curvature in the intermediate portion except for a connecting portion between the portion for distance vision and the intermediate portion is increased and then decreased as a position in the intermediate portion is separated from the principal meridional curve. In the portion for near vision, a radius of curvature is increased and then decreased as a position in the portion for near vision is separated from the principal meridional curve. Regarding the visual characteristics, the technique disclosed in Japanese Patent Publication No. 59-42285 can be improved to some extent as compared with the technique disclosed in Japanese Patent Publication Nos. 49-3595 and 52-20271. However, the technique disclosed in Japanese Patent astigmatic difference in a peripheral area of the portion for distance vision, i.e., in side areas of the portion for distance vision from the center to the lower area therein. In addition, image distortion and shift are still present in the side areas of the intermediate portion and the portion for near vision. Therefore, a sufficiently wide field of view cannot yet be assured.

SUMMARY OF THE INVENTION

It is, therefore, a first object of the present invention to solve the above conventional technical problems and to provide ophthalmic lenses having a progressively variable refracting power, which have a good aberrational balance, and more particularly, to provide ophthalmic lenses having a progressively variable refracting power, which have a wide field of view at a lower position in the portion for distance vision and practically sufficient clear vision areas in the intermediate portion and the portion for near vision, and which can make it possible for a user not to feel discomfort in side views by minimizing image distortion and shift in the peripheral portions of the intermediate portion and the portion for near vision.

It is a second object of the present invention to provide ophthalmic lenses having a progressively variable refracting power, in which an aberration density can be reduced in a progressively variable refracting power area in the side portion of the principal meridional curve from the lower position in the portion for distance vision to the portion for near vision, and image distortion and shift can be minimized in all the areas of the portion for near vision, the intermediate portion, and the portion for distance vision, so that a user who wears these lenses for the first time will not experience discomfort.

An ophthalmic lens having a progressively variable refracting power according to the present invention comprises a portion for distance vision having a refracting power corresponding to a far scene in an upper area of the lens along the principal meridional curve, a portion for near vision having a refracting power corresponding to a near scene in a lower area of the lens, and an intermediate portion defined between the portions for distance vision and near vision and having a progressively variable refracting power between the refracting powers of the portions for distance vision and near vision. In this lens, optimal cross-sectional and longitudinally sectional shapes of the refracting surfaces of the respective portions are found to optimize the aberration balance in the entire area of the refracting surfaces.

The cross-sectional shape of the refracting surface of the portion for distance vision in the ophthalmic lens having a progressively variable refracting power is substantially circular at substantially the center of the portion for distance vision. A radius of curvature at an upper position in the portion for distance vision is increased and then decreased as the position is separated from an intersection with the principal meridional curve, A lower position in the portion for distance vision has a tendency opposite to that described above. A longitudinally sectional shape of the refracting surface of the portion for distance vision is determined as follows. A radius of curvature at an upper position in the portion for distance vision is increased as the position is separated from the intersection with the principal meridional curve along a cross-sectional intersection line. A lower position in the portion for distance vision has a tendency opposite to that described above. A radius of curvature at substantially the center of the portion for distance vision is kept almost constant. Therefore, the portion for distance vision can be assured to be very large and at the same time can smoothly continue to the intermediate portion. In addition, concentration of an astigmatic difference can be suppressed in side areas of the intermediate portion. Furthermore, the clear vision area of the intermediate portion can be assured to be wide to reduce image distortion and shift in its peripheral area.

The cross-sectional shapes of the refracting surfaces of the intermediate portion and the portion for near vision are given as a noncircular shape in which a radius of curvature is increased and then decreased as these portions are separated from the intersection point with the principal meridional curve. The longitudinally sectional shape of the refracting surface of the portion for near vision is determined such that a radius of curvature is increased and then kept constant as the portion for near vision is separated from the intersection point with the principal meridional curve along the cross-sectional intersection line. With the above arrangement, the ophthalmic lens having a progressively variable refracting power has a wide clear vision area of the portion for distance vision, concentration of the astigmatic difference in the intermediate portion and the portion for near vision can be suppressed with a good balance, and image distortion and shift in the side areas can be reduced, thereby obtaining excellent visual characteristics.

In the side areas in the ophthalmic lens having a progressively variable refracting power with respect to the principal meridional curve according to the present invention, an average refracting power on the lens surface and a value associated with the Gaussian curvature are used as parameters to define lens aberration quantitatively. Therefore, design and evaluation of the ophthalmic lens having a progressively variable refracting power can be established on the basis of these parameters.

The above and other objects, features, and advantages of the present invention will be apparent from the following detailed description in conjunction with the accompanying drawings.

BRIEF DESCRIPTION OF THE DRAWINGS

FIGS. 4A and 4B are respectively graphs showing a curve representing a change in radius of curvature in the horizontal direction and a curve representing a change in radius of curvature in the vertical direction along the cross section according to an embodiment of the present invention;

FIG. 6 is a graph showing a distribution representing values $\Delta q$ as condition corresponding values in the embodiment of the present invention;

DESCRIPTION OF THE PREFERRED EMBODIMENTS

Figure 1:
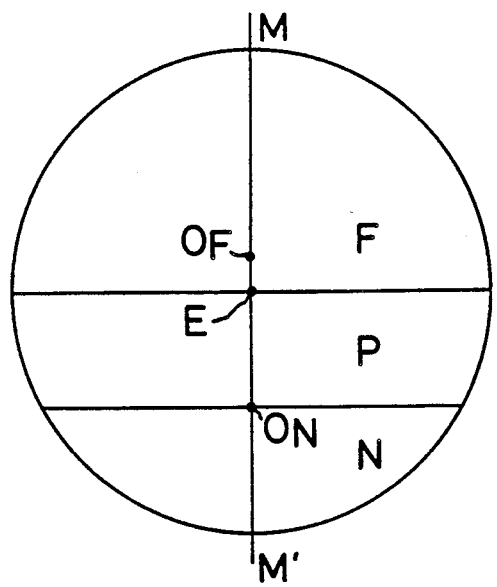
FIG. 1 is a schematic plan view showing areas of an ophthalmic lens having a progressively variable refracting power according to the present invention.

FIG. 1 is a schematic plan view showing areas of an ophthalmic lens having a progressively variable refracting power before the periphery of the lens is worked to match the size of a frame. A lens surface consists of a portion F for distance vision (to be referred to as a portion F hereinafter) as an upper lens area having a refracting power corresponding to a far scene, a portion N for near vision (to be referred to as a portion N hereinafter) as a lower area having a, refracting power corresponding to a near scene, and an intermediate portion P defined between the portions F and N and having a progressively variable refracting power between the refracting powers of the portions F and N. These portions are formed along a principal meridional curve MM' which passes through a center $O_F$ of the portion F and a center $O_N$ of the portion N. The cross and longitudinal sections of the lens of the present invention will be described below.

Figure 2A:
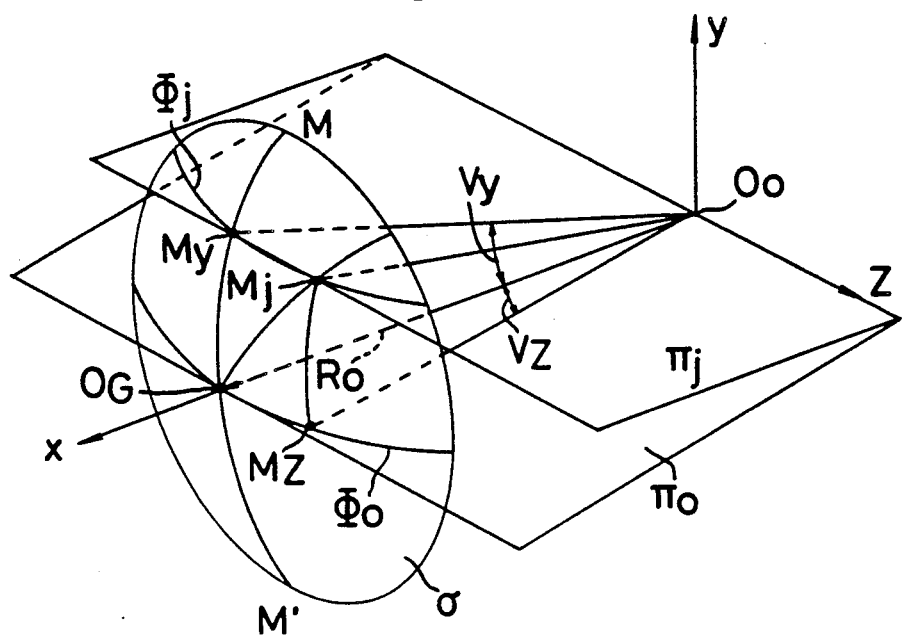
FIGS. 2A and 2B are respectively perspective views for explaining cross and longitudinal sections of a refracting surface of the ophthalmic lens having a progressively variable refracting power according to the present invention.
Figure 2B:
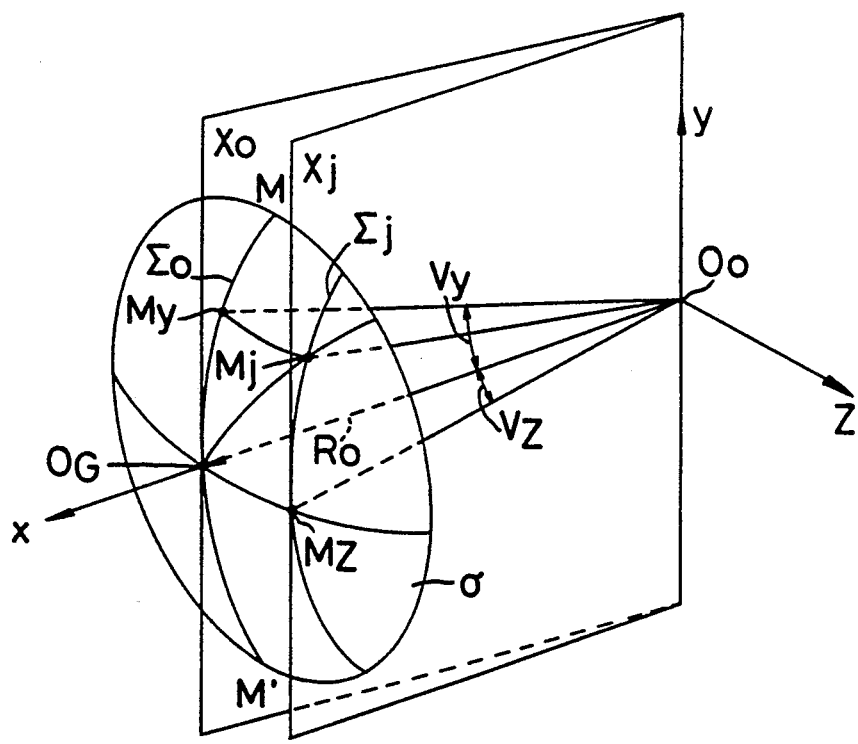

FIGS. 2A and 2B are respectively perspective views for explaining the cross and longitudinal sections of a lens refracting surface $\sigma$. Referring to FIGS. 2A and 2B, an optical axis which passes through a geographic center $O_G$ of the lens is defined as the x-axis, a center $O_o$ is defined as the center of curvature on the refracting surface at the geographic center $O_G$, and a spherical surface having a radius $R_0$ of curvature of the refracting surface $\sigma$ at the geographic center $O_o$ as its radius is defined as a reference spherical surface of the lens. Therefore, the reference spherical surface is in contact with the refracting surface $\sigma$ of the lens at the geographic center $O_G$. The y-axis is defined as a vertical line which has the center $O_o$ of the reference spherical surface as its origin, and the z-axis is defined as a horizontal line which has the center $O_o$ of the reference spherical surface as its origin.

The cross section of the present invention is defined as a cross section of the refracting surface $\sigma$ which is defined by a plane $\pi_j$ perpendicular to a plane (i.e., the x-y plane) passing through the center $O_o$ of the reference spherical surface and including the principal meridional curve MM'. The cross section is given as a cross-sectional intersection line $\phi_j$, as shown in FIG. 2A. A longitudinal section according to the present invention is defined as a longitudinal section of the refracting surface $\sigma$ defined by a plane $\chi_j$ which passes through the center $O_o$ of the reference spherical surface and includes the y-axis. The longitudinal section is given by a longitudinally sectional intersection line $\Sigma_j$, as shown in FIG. 2B.

Figure 3:
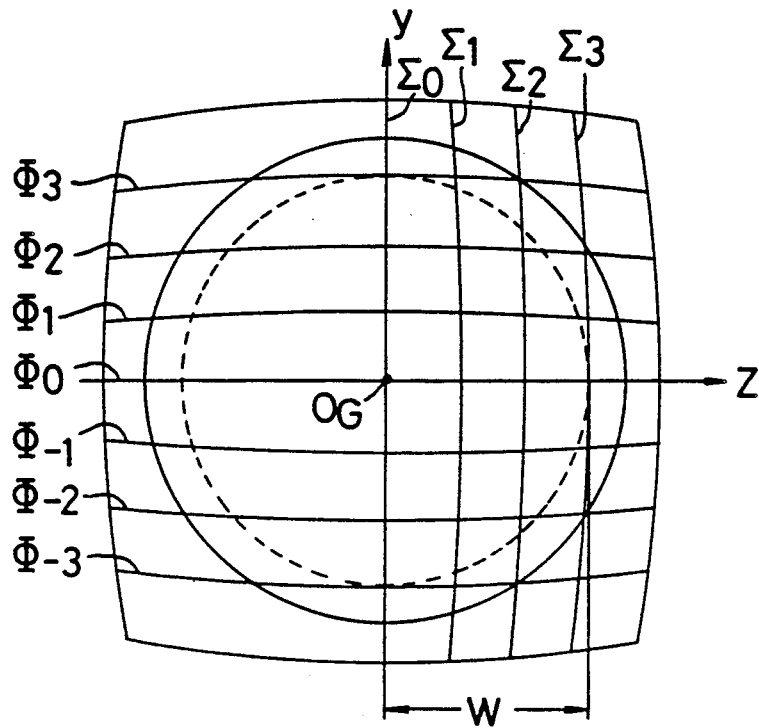
FIG. 3 is a plan view showing states of a cross-sectional intersection line and a longitudinally sectional intersection line for explaining the ophthalmic lens having a progressively variable refracting power according to the present invention.
Figure 4A:
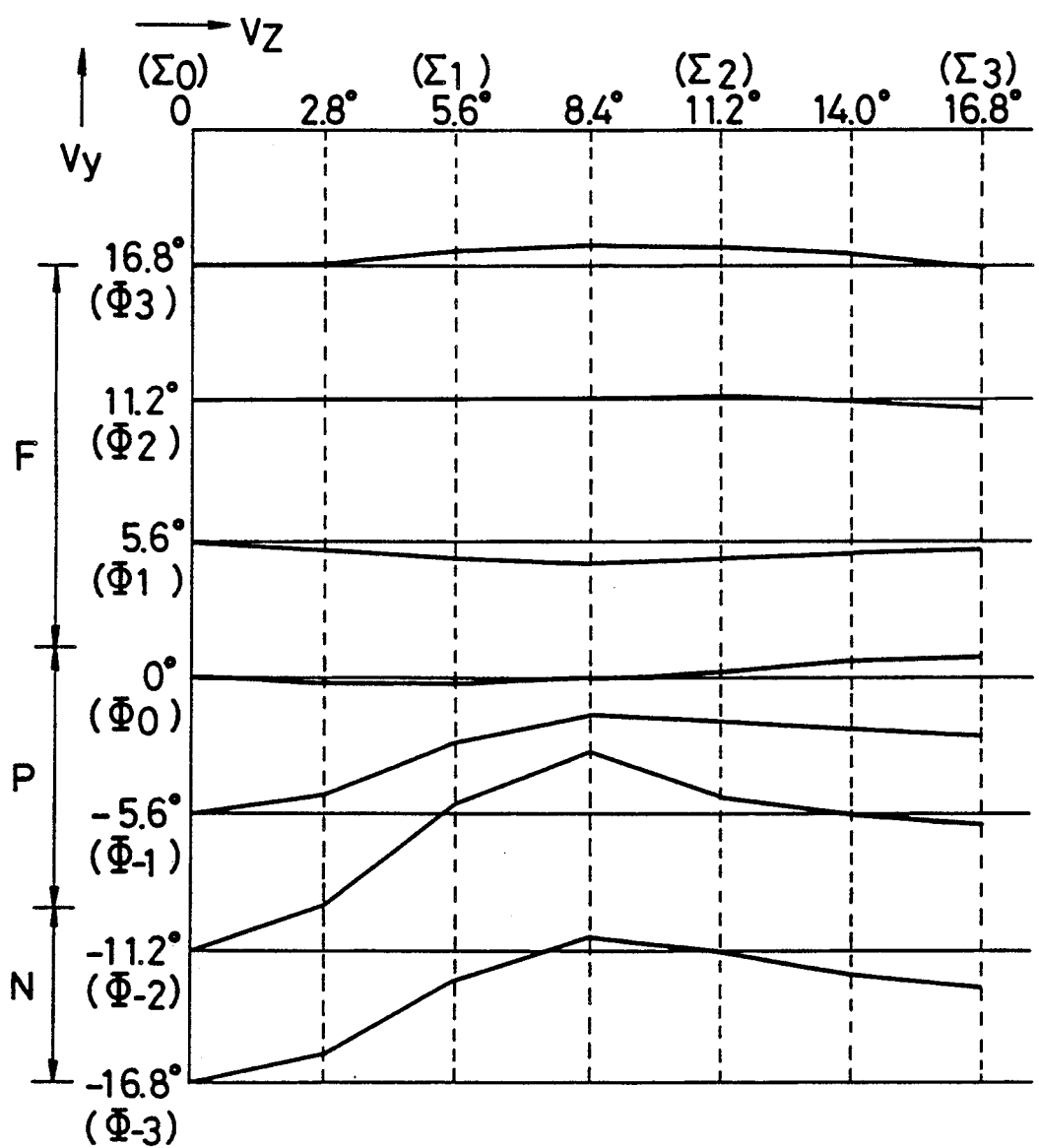

FIG. 3 is a plan view showing a state of positions of the cross-sectional intersection lines $\phi_j$ and the longitudinally sectional intersection lines $\Sigma_j$ on the refracting surface $\sigma$ of the lens. The radii of curvature of the cross-sectional intersection lines $(\phi_3, \phi_2, \phi_1, \ldots)$ (FIG. 3) in the horizontal direction are changed on the right half of the refracting surface $\sigma$ with reference to the horizontal radius of curvature on the principal meridional curve MM', as shown in FIG. 4A. The radii of curvature of the longitudinally sectional intersection lines are changed on the right half of the refracting surface $\sigma$ with reference to the vertical radius of curvature on the principal meridional curve MM', as shown in FIG. 4B. Note that the cross-sectional and longitudinally sectional intersection lines $\phi_j$ and $\Sigma_j$ represent the cross-sectional and longitudinally sectional curves of the present invention, respectively.

More specifically, FIG. 4A is a graph obtained by plotting the values of horizontal radii of curvature along the cross-sectional intersection lines $\phi_3$ to $\phi_{-3}$ at seven typical cross sections which intersect the principal meridional curve MM' for the right half of the surface with respect to the principal meridional curve MM'. In the FIG. 2A, the value of each plotted radius of curvature is a horizontal radius of curvature at a point $M_j$ which intersects the longitudinally sectional intersection line $\Sigma_j$ defined by the vertical plane $(\chi_j)$ (FIG. 2B) including the y-axis along the cross-sectional intersection line $\phi_j$ of the refracting surface $\sigma$ which is defined by a plane $\pi_j$ perpendicular to the x-y plane passing through the center $O_o$ of the reference spherical surface and including the principal meridional curve MM'. FIG. 4A shows a plot of values of the horizontal radii of curvature when a horizontal angle $V_z$ formed between the vertical plane $(\chi_j)$ including the y-axis and the plane (i.e., the x-y plane) including the principal meridional curve MM' is given every 5.6° on each cross-sectional plane along seven cross-sectional intersection lines $(\phi_3, \phi_2, \phi_1, \phi_0, \phi_{-1}, \phi_{-2},$ and $\phi_{-3})$ defined by seven planes $(\rho_3 \pi_2, \pi_1, \pi_0, \pi_{-1}, \pi_{-2},$ and $\pi_{-3})$ obtained such that an angle $V_y$ formed between an optical axis (x-axis) and the plane $\pi_j$ perpendicular to the plane (i.e., the x-y plane) passing through the center $O_o$ of the reference spherical surface and including the principal meridional curve MM' is changed every 5.6°.

According to this embodiment, as shown in FIG. 4A, a cross-sectional shape of the refracting surface at a lower position (5.6°) in the portion F has a noncircular curve given such that a horizontal radius of curvature is decreased and then increased as the position is separated from an intersection with the principal meridional curve MM'. A cross-sectional shape of the refracting surface at an upper position (16.8°) in the portion F is a noncircular shape given such that a horizontal radius of curvature is increased and then decreased as the position is separated from the intersection with the principal meridional curve MM'. A cross-sectional shape of the refracting surface at almost the center (11.2°) of the portion F is a substantially circular shape given such that the horizontal radius of curvature of the cross section of the refracting surface is substantially kept constant.

A cross-sectional shape of the refracting surface at the central portion (−5.6°) of the intermediate portion P is a noncircular shape given such that a horizontal radius of curvature is increased and then decreased as the position is separated from the intersection with the principal meridional curve MM'. A rate of increase and a rate of decrease in radius of curvature are increased near the portion N. This tendency is apparent in comparison with the cross-sectional shape (−11.2) of the portion N.

A cross-sectional shape of the refracting surface in the portion N (−11.2 to −16.8) is a noncircular shape given such that a horizontal radius of curvature is increased and then decreased as a position in the portion N is separated from the intersection with the principal meridional curve MM'. A position where the direction of change in horizontal radius of curvature is changed from an increase to a decrease is effectively defined as a W/2 (where W is the radius of the ophthalmic lens having a progressively variable refracting power) position, as shown in FIG. 3, and more preferably falls within the practical range of W/4 to 3W/4 from the principal meridional curve in the horizontal direction. In this case, the radius of the ophthalmic lens having a progressively variable refracting power is defined as half of the diameter of the effective lens surface prior to fitting of the lens into a frame. Generally, the value of the ophthalmic lens is 30–40 mm. The effective lens surface is defined as an effective lens range formed by a smooth curved surface and excludes a collar portion used to fit the lens into the frame.

Changes in radius of curvature in the horizontal direction along the cross section described above are described below. An increase in horizontal radius of curvature in a side area of an upper position (16.8°) in the portion F is about 5% with respect to the horizontal radius of curvature at the intersection between the corresponding cross section and the principal meridional curve. A decrease in horizontal radius of curvature at a lower position (5.6°) in the portion F is about 5% with respect to the horizontal radius of curvature at the intersection between the corresponding cross section and the principal meridional curve. Changes from an increase to a decrease in horizontal radius of curvature at the intermediate portion P are given as follows. A maximum value of a change in horizontal radius of curvature is effectively given as an increase of about 30% with respect to the horizontal radius of curvature at the intersection between the corresponding cross section and the principal meridional curve MM'. Regarding an increase or decrease in horizontal radius of curvature in the portion N, its maximum value is effectively an increase of about 70% with respect to the horizontal radius of curvature at the intersection between the corresponding cross section and the principal meridional curve MM'. A maximum value of the horizontal radius of curvature in the side area of the center $O_N$ is effectively an increase of about 50% to 100% with respect to the radius of curvature at the intersection between the corresponding cross section and the principal meridional curve MM'.

Figure 5A:
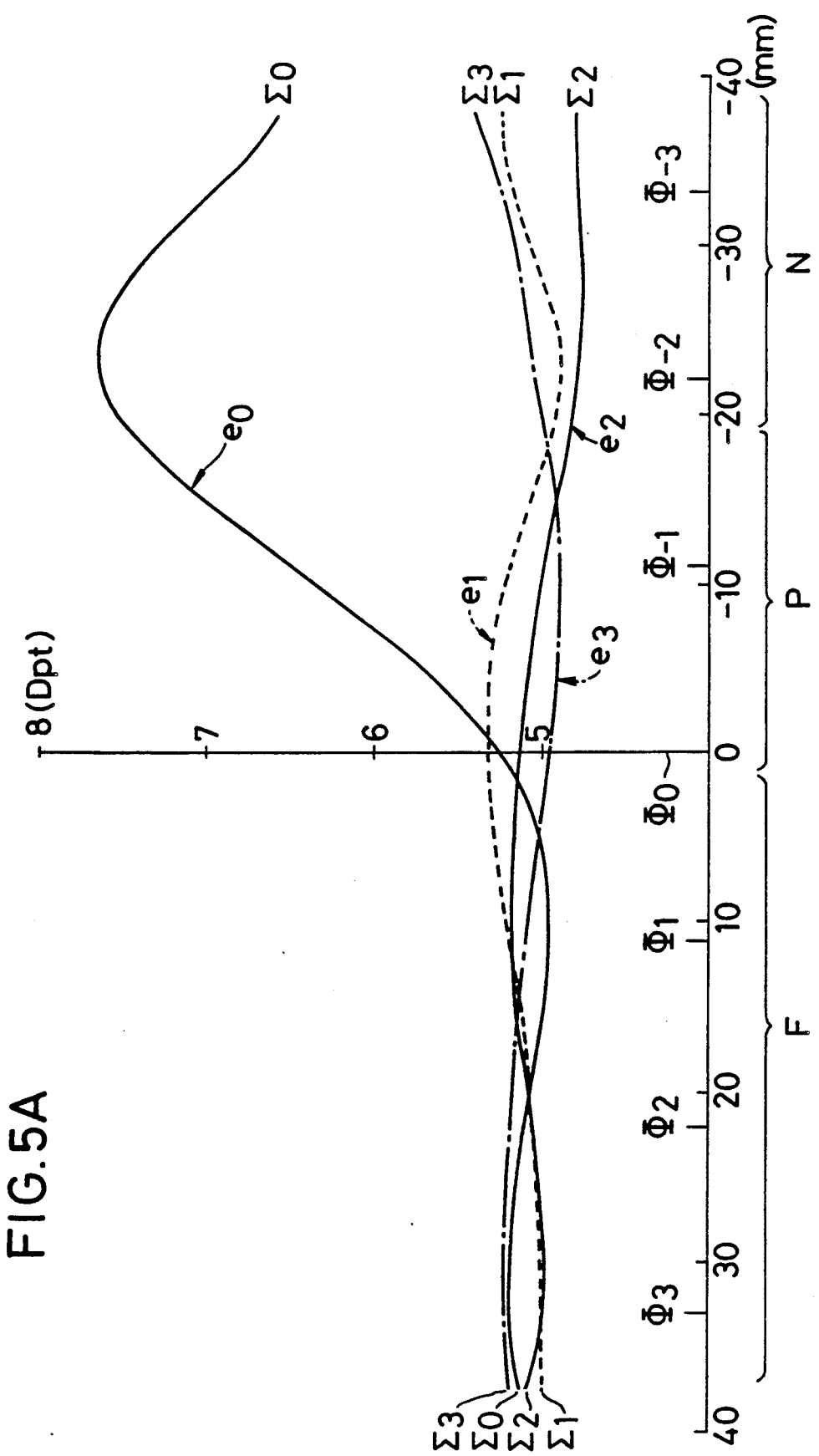
FIGS. 5A and 5B are respectively graphs showing a curve representing a change in horizontal refracting power along a longitudinally sectional intersection line and a curve representing a change in vertical refracting power along a longitudinally sectional intersection line.

FIG. 5A shows curves in changes in horizontal refracting power corresponding to the horizontal radii of curvature along the longitudinally sectional intersection lines $\Sigma_i$. That is, the curves are obtained by plotting the horizontal refracting powers at points intersecting with the cross-sectional intersection lines along the longitudinally sectional intersection lines $\Sigma_j$ defined by the vertical plane $(\chi_i)$ including the y-axis) on the refracting surface $\sigma$ in FIG. 2B. These curves show vertical changes in horizontal radius of curvature of the refracting surface $\sigma$ by means of curvature values. These curves also serve as additional power curves along various longitudinally sectional intersection lines. The horizontal radius of curvature is closely related to the refracting power. In general, curvature p is expressed as follows:

$$\rho = 1/R$$

where R is the radius of curvature and n is a refractive index of the lens. The refracting power D is defined as follows:

$$D = (n-1)/R = (n-1)\rho$$

When the radius of curvature is given in units of meters, the refracting power D is given in units of diopters.

The longitudinally sectional intersection line $\Sigma_0$ in FIG. 5A corresponds to the principal meridional curve MM' ($V_z = 0°$). Changes in horizontal refracting power along the principal meridional curve MM' are represented by a curve $e_0$. The longitudinally sectional intersection lines $\Sigma_1, \Sigma_2,$ and $\Sigma_3$ correspond to horizontal angles $V_z = 5.6°, 11.2°,$ and $16.8°$. Changes in horizontal refracting power along the respective longitudinally sectional intersection lines are represented by curves $e_1, e_2,$ and $e_3$. If $V_z = 16.8°$ almost corresponds to a maximum effective aperture size of an ophthalmic lens having a progressively variable refracting power, the longitudinally sectional intersection lines $\Sigma_1$, $\Sigma_2$, and $\Sigma_3$ correspond to W/3, 2W/3, and W (where W is the radius of the lens shown in FIG. 3), respectively.

As shown in the curve $e_3$ in FIG. 5A, in an upper position (left end in FIG. 5A) of the portion F, a refracting power of the edge ($\Sigma_3$) of the lens is larger than the horizontal refracting power ($e_0$) on the principal meridional curve MM, Each of the horizontal refracting powers ($e_1$ and $e_2$) of the central portions ($\Sigma_1$ and $\Sigma_2$) of the side area of the lens is smaller than the horizontal refracting power ($e_0$) on the principal meridional curve MM'. These refracting powers are equal to each other at the central position in the portion F. At almost the center of the intermediate portion P, a change in horizontal refracting power ($e_0$) on the principal meridional curve is largest, while changes in other refracting powers ($e_1$, $e_2$, and $e_3$) are small. In addition, the refracting power ($e_3$) at the edge ($\Sigma_3$) of the lens is smaller than each of the horizontal refracting powers ($e_1$ and $e_2$) at side areas of the intermediate portion.

In the portion N, the refracting power ($e_0$) on the principal meridional curve is the largest. The refracting power ($e_0$) is increased with a predetermined additional power and is decreased at a lower position in the portion N. The horizontal refracting powers in the side areas at an upper position in the portion N are given as follows. The horizontal refracting powers ($e_1$ and $e_2$) in the central portions ($\Sigma_1$ and $\Sigma_2$) of the side area are decreased. In this case, the refracting power $e_2$ is the smallest. The horizontal refracting power ($e_3$) in the edge ($\Sigma_3$) is then slightly increased. As shown in FIG. 3, if the effective diameter of the lens is given as W, the horizontal refracting power in the area ($\Sigma_1$) spaced apart from the principal meridional curve MM'by W/3 or more in a direction perpendicular to the principal meridional curve MM'has a slight variation with respect to the surface refracting power (5 diopters) at the center $O_F$. When the additional power is defined as $A_D$ (diopter) as in this embodiment, an effective range falls within $\pm A_D/2$ diopters.

FIG. 4B shows a plot of values of the vertical radii of curvatures of seven typical cross sections along the respective cross-sectional intersection lines $\phi_3$ to $\phi_{-3}$ with reference to the vertical radius of curvature of the principal meridional curve MM'. In this case, the seven cross sections intersect the principal meridional curve MM'.

The value of each plotted radius of curvature is a vertical radius of curvature at a point $M_j$ along the cross-sectional intersection line $\phi_j$ of the refracting surface $\sigma$ which is defined by the plane $\pi_j$ (FIG. 2A) perpendicular to the plane (i.e., the x-y plane) passing through the center $O_o$ of the reference spherical surface and including the principal meridional curve MM'. In this case, the point $M_j$ intersects the longitudinally sectional intersection line $\Sigma_j$ defined by the vertical plane ($\chi_j$) (FIG. 2B) including the y-axis. FIG. 4B shows a plot of values of the vertical radii of curvatures when a horizontal angle $V_z$ formed between the vertical surface ($\chi_j$) including the y-axis and the plane (i.e., the x-y plane) including the principal meridional curve MM'is given every 5.6° on each cross-sectional plane along seven cross-sectional intersection lines ($\phi_3$, $\phi_2$, $\phi_1$, $\phi_0$, $\phi_{-1}$, $\phi_{-2}$, and $\phi_{-3}$) defined by seven planes ($\pi_3$, $\pi_2$, $\pi_1$, $\pi_0$, $\pi_{-1}$, $\pi_{-2}$, and $\phi_{-3}$) obtained such that an angle $V_y$ formed between an optical axis (x-axis) and the plane $\pi_j$ perpendicular to the plane (i.e., the x-y plane) passing through the center $O_o$ of the reference spherical surface and including the principal meridional curve MM'is changed every 5.6°.

According to this embodiment, as shown in FIG. 4B, a longitudinally sectional shape of the refracting surface at an upper position (16.8°) in the portion F is a noncircular shape given such that a vertical radius of curvature is increased and then decreased as the position is separated from the intersection with the principal meridional curve MM' in the same manner as in the horizontal radius of curvature shown in FIG. 4A. A longitudinally sectional shape of the refracting surface at a lower position (5.6°) in the portion F is given such that a vertical radius of curvature is decreased and then kept constant as the point is separated from the principal meridional curve MM'. The radius of curvature of the longitudinal section of the refracting surface at almost the central portion (11.2°) of the portion F is kept almost constant.

A longitudinally sectional shape of the refracting surface near the center $O_N(-11.2°)$ of the portion N is given such that its vertical radius of curvature is increased and then kept almost constant as the center $O_N$ is separated from the intersection with the principal meridional curve MM' along the cross-sectional curve. A position where the vertical radius of curvature is kept almost constant after increase near the center $O_N$ is a W/2 (where W is the radius of the ophthalmic lens having a progressively variable refracting power, as shown in FIG. 3) position, and preferably falls within the practical range of W/4 to 3W/4 from the principal meridional curve in the horizontal direction. The constant value upon an increase in vertical radius of curvature in the side area near the center $O_N$ is an increase of about 20% with respect to the vertical radius of curvature at the intersection between the corresponding cross section and the principal meridional curve. In practice, an effective increase falls within the range of 10% to 50%, and more preferably 10% to 30%.

Figure 5B:
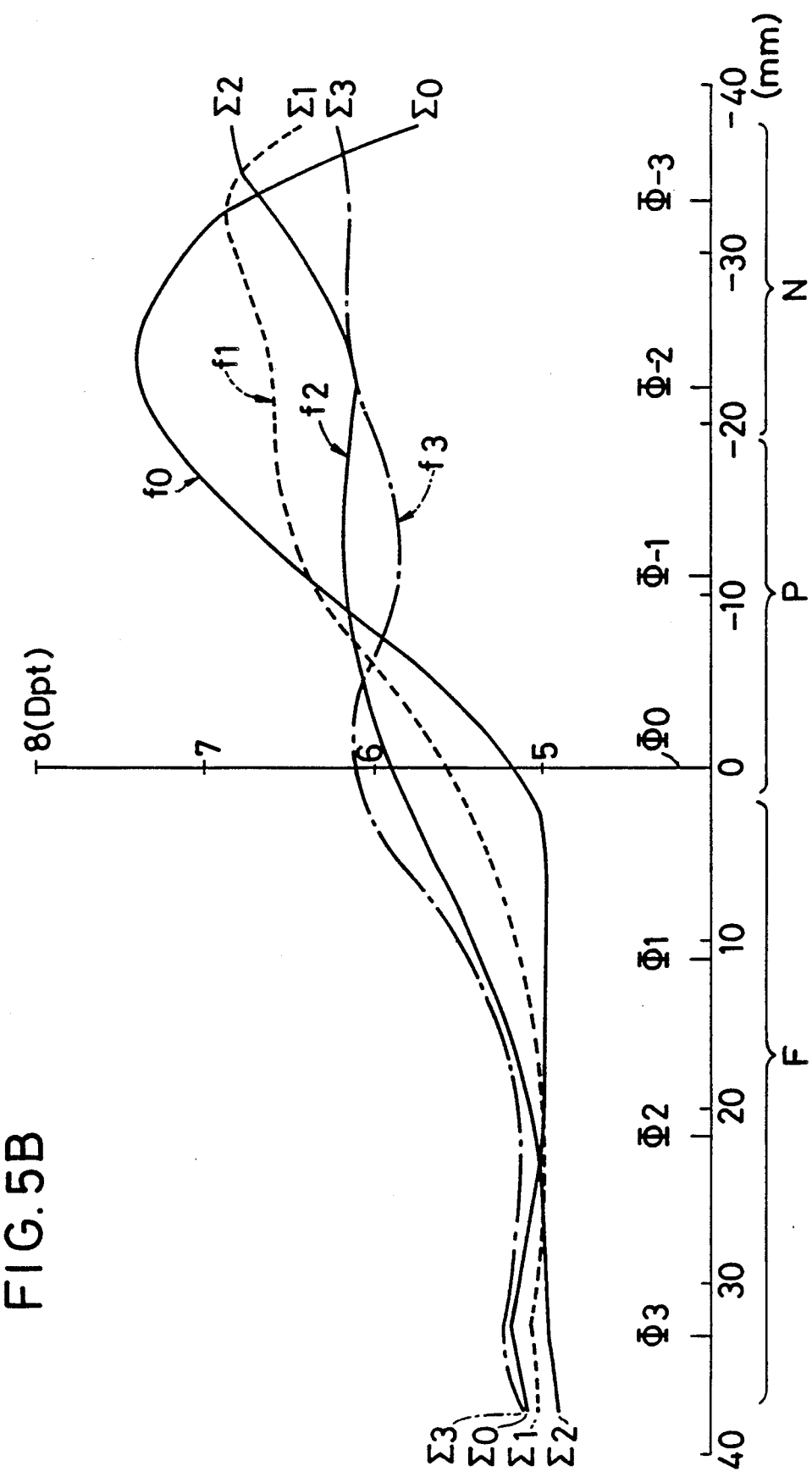

FIG. 5B shows curves representing changes in vertical refracting powers corresponding to the vertical radii of curvature along the longitudinally sectional intersection line $\Sigma_i$. That is, the curves are obtained by plotting the vertical refracting powers at the respective points intersecting the cross-sectional intersection lines, along the longitudinally sectional intersection line $\Sigma_i$ defined by the vertical plane ($\chi_i$) including the y-axis on the refracting surface $\sigma$. These curves represent changes in vertical radii of curvature of the refracting surface $\sigma$.

The longitudinally sectional intersection line $E_0$ in FIG. 5B coincides with the principal meridional curve MM'($V_z=0$), and changes in vertical refracting power along the principal meridional curve are represented by a curve $f_0$. The longitudinally sectional intersection lines $\Sigma_1$, $\Sigma_2$, and $\Sigma_3$ correspond to $V_z=5.6°$, 11.2°, and 16.8°, respectively. Changes in vertical refracting powers along the respective longitudinally sectional intersection lines are represented by curves $f_1$, $f_2$, and $f_3$. If $V_z=16.8°$ corresponds to the maximum effective aperture size of the ophthalmic lens having a progressively variable refracting power, the longitudinally sectional intersection lines $\Sigma_1$, $\Sigma_2$, and $\Sigma_3$ correspond to W/3, 2W/3, and W (where W is the radius of the lens shown in FIG. 3), respectively.

As shown in the curves in FIG. 5B, the vertical refracting power ($f_0$) on the principal meridional curve MM' is larger than the vertical refracting power ($f_3$) at the edge ($\Sigma_3$) of an upper position (i.e., a left end portion in FIG. 5B) of the portion F and is smaller than each of the vertical refracting powers ($f_1$ and $f_2$) at the central positions of the side area corresponding to the upper position of the portion F. These refracting powers are equal to each other at the central position in the portion F.

The relationship between the refracting powers at an eye point at a lower position in the portion F is given as follows. The vertical refracting power ($f_3$) at the edge ($\Sigma_3$) of the lens is larger than each of the vertical refracting powers ($f_1$ and $f_2$) at the central portions ($\phi_1$ and $\phi_2$) of the side area of the lens with respect to the smallest vertical refracting power ($f_0$) on the principal meridional curve MM'.

It is apparent that the vertical refracting powers ($f_0$, $f_1$, $f_2$, and $f_3$) are almost equal to each other at substantially the center of the intermediate portion P, and that the vertical refracting powers are almost equal to each other along the cross-sectional intersection line. The vertical refracting power ($f_0$) on the principal meridional curve MM' at a lower position in the intermediate portion P is maximum, while other vertical refracting powers are decreased in the order of $f_1$, $f_2$, and $f_3$. The refracting power is decreased toward the edge along the cross-sectional intersection line.

The vertical refracting power ($f_1$) is smaller than the vertical refracting power ($f_0$) on the principal meridional curve which is maximum near the center $O_N$, and other vertical refracting powers ($f_2$ and $f_3$) are equal to each other and smaller than the refracting power ($f_0$). These vertical refracting powers ($f_0$, $f_1$, and $f_2$) are almost equal to each other at a lower position in the portion N. Only the vertical refracting power ($f_3$) of the edge ($\Sigma_3$) of the lens is smaller than any other vertical refracting power ($f_0$, $f_1$, and $f_2$).

The present inventors made extensive studies on a relationship between lens aberration and the surface shape of the ophthalmic lens having a progressively variable refracting power and found that uncomfortable visual characteristics such as image blurring and distortion which typically occurred in the side areas of the intermediate portion P and shift upon movement of the line of sight were mainly influenced by a density distribution of lens aberration. Therefore, not only the maximum value of lens aberration must be minimized, but also the density distribution and its gradient must be minimized, thereby improving the visual characteristics of the ophthalmic lens having a progressively variable refracting power.

A difference $\Delta q$ between the average refracting power Q of the surface and a value G associated with the Gaussian curvature is closely related to the density distribution of lens aberration. Therefore, the present inventors found that the density distribution of lens aberration and the gradient could be minimized by forming an ophthalmic lens having a progressively variable refracting power so as to satisfy the following conditions. The present inventors found that lens aberration could be quantitatively defined using the average refracting power Q and the value G associated with the Gaussian curvature as parameters in the side areas of the principal meridional curve MM' in the ophthalmic lens having a progressively variable refracting power as shown in FIG. 1. Therefore, the present inventors established a criterion for design and evaluation of the above-mentioned ophthalmic lens having a progressively variable refracting power on the basis of the above new viewpoint.

The ophthalmic lens having a progressively variable refracting power according to the present invention has a surface shape such that the difference $\Delta q$ between the surface average refracting power Q and a value G obtained by multiplying a square root of the Gaussian curvature with a refractivity (n−1) in a side area satisfies the following condition. In this case, the side area serves as a bright area within an area from the intermediate portion P to a lower position in the portion N along the principal meridional line MM' and has an astigmatic difference of 0.5 diopter or less.

$$A_D^2/(500(P_B + 1)) \leq |\Delta q| \leq A_D^2/(3P_B + 4A_D) \quad (1)$$

for $\Delta q = Q - G$ $$G = (n - 1)\sqrt{K}$$

where $A_D$: the additional power (diopter)

$P_B$: the reference average refractive index in the portion for distance vision (diopter)

K: the Gaussian curvature Note that $P_B$ is a value called a base curve of an ophthalmic lens having a progressively variable refracting power.

The above condition will be described in detail.

According to formulas in differential geometry, a principal radius R of curvature of a free curved surface is generally known to be obtained by two roots of the following equation (e.g., "Differential Geometry", Tominosuke Otsuki, 1962, September, Asakura Shoten):

$$a/R^2 - b/R + c = 0$$

for $a = q_{YY}q_{ZZ} - (q_{YZ})^2$ $b = q_{YY}H_{ZZ} - 2q_{YZ}H_{YZ} + q_{ZZ}H_{YY}$ $c = H_{YY}H_{ZZ} - (H_{YZ})^2$ First Fundamental Quantities of Differential Geometry $q_{YY} = 1 + (\partial X/\partial Y)^2$ $q_{YZ} = q_{ZY} = (\partial X/\partial Y) \cdot (\partial X/\partial Z)$ $q_{ZZ} = 1 + (\partial X/\partial Z)^2$ Second Fundamental Quantities of Differential Geometry $H_{YY} = N_X(\partial^2 X/\partial Y^2)$ $H_{YZ} = H_{ZY} = N_X(\partial^2 X/\partial Y \partial Z)$ $H_{ZZ} = N_X(\partial^2 X/\partial Z^2)$ for $N_X = \sqrt{1 + (\partial X/\partial Y)^2(\partial X/\partial Z)^2}$ As shown in FIGS. 2A and 2B, the X-axis is defined as the optical axis, and the Y-axis is defined as the meridional curve.

If two roots of this equation are given as $1/R_1$ and $1/R_2$, the following equations are derived:

$$H = (\tfrac{1}{2})(1/R_1 + 1/R_2) = b/2a$$

$$= (q_{YY}H_{ZZ} - 2q_{YZ}H_{YZ} + q_{ZZ}H_{YY})/2(q_{YY}q_{ZZ} - (q_{YZ})^2)$$

$$K = 1/R_1R_2 = c/a$$

$$= (H_{YY}H_{ZZ} - (H_{YZ})^2)/(q_{YY}q_{ZZ} - (q_{YZ})^2)$$

where

H: the average curvature based on the two principal radii $R_1$ an $R_2$ of curvature which are perpendicular to each other K: the Gaussian curvature.

In general, if a principal radius of curvature is given as $r_1$, a surface focal power $P_1$ in the direction of this principal radius of curvature is expressed as follows:

$$P_1 = (n-1)/r_1$$

when the radius $r_1$ is expressed in units of meters, the refracting power is expressed in units of diopters.

The relationship between the curvature and the refracting power of the surface is expressed as a refracting power of the surface when the curvature is multiplied with the refractivity. An average refracting power Q and a refracting power G of the Gaussian curvature of this surface can be expressed using the average curvature H and the Gaussian curvature K as follows:

$$Q = (n-1) \times H$$

$$G = (n-1) \times \sqrt{K}$$

A difference $\Delta q$ between the average refracting power Q and the refracting power G of the Gaussian curvature, i.e., $q = Q - G$, can be obtained as follows:

$$\Delta q = Q - G$$

$$= (n-1)(H - \sqrt{K})$$

As is apparent from the above equation, the difference $\Delta q$ is given as a product obtained by multiplying the refractivity with a difference between the average curvature H and a square root of the Gaussian curvature K.

This parameter can appropriately express the distribution of astigmatic differences of the surface refracting powers of the lens, i.e., the astigmatic difference and its gradient. Condition (1) defines a curved surface of the lens refracting surface which suppresses shift and distortion which are caused by the astigmatic difference.

When the difference $\Delta q$ between the average refracting power Q and the value Q obtained from the square root of the Gaussian curvature K exceeds the upper limit of condition (1), the astigmatic difference is increased to typically cause shift and distortion, thereby increasing a defocus or blurring range and degrading the image. As a result, it is difficult to use such a lens in practice.

However, when the difference $\Delta q$ is decreased, shift and distortion are reduced as far as the distribution of astigmatic differences of the surface refracting powers is concerned, thereby obtaining good visual characteristics. However, when the difference is smaller than the lower limit of condition (1), the length of the intermediate portion P must be unnecessarily increased, and the resultant lens is impractical. In addition, it is also necessary to widen the range of the astigmatic difference distribution to the side areas of the portion F. The clear vision area of the portion F is narrowed. It is therefore difficult to obtain a lens well balanced in the portions F, P, and N as an ophthalmic lens having a progressively variable refracting power.

Within the range defined by condition (1), when a lens has a diameter of 50 mm with respect to the geometric center of the lens effectively used for substantial correction of the amplitude of accommodation within the frame, the difference preferably satisfies condition (2) below:

$$A_D^2/500(P_B+1) \leq |\Delta q| \leq 2A_D^2/3(3P_B+4A_D) \qquad (2)$$

The side areas of 1 diopter or more in which the astigmatic difference of the surface refracting power is negligible must effectively satisfy condition (2).

FIG. 6 shows the differences $\Delta q$ at the respective points of the lens. In this embodiment, the lens has a diameter of 70 mm. The differences at points at intervals of 5 mm along the principal meridional curve and in a direction perpendicular to the principal meridional curve are shown in FIG. 6.

In this embodiment,

Additional Power: $A_D = 2.5$ (diopters)

Reference Average Refracting Power of Portion F: $P_B = 5.0$ (diopters)

Therefore, condition (1) can be rewritten as:

$$0.00208 \leq |\Delta q| \leq 0.25$$

The side areas (values surrounded by a thick line) of the principal meridional curve MM' which have astigmatic differences of 0.5 diopter or more and serve as the clear vision areas fall within the above condition and have the surface shape having appropriate astigmatic differences and gradient.

Figure 7:
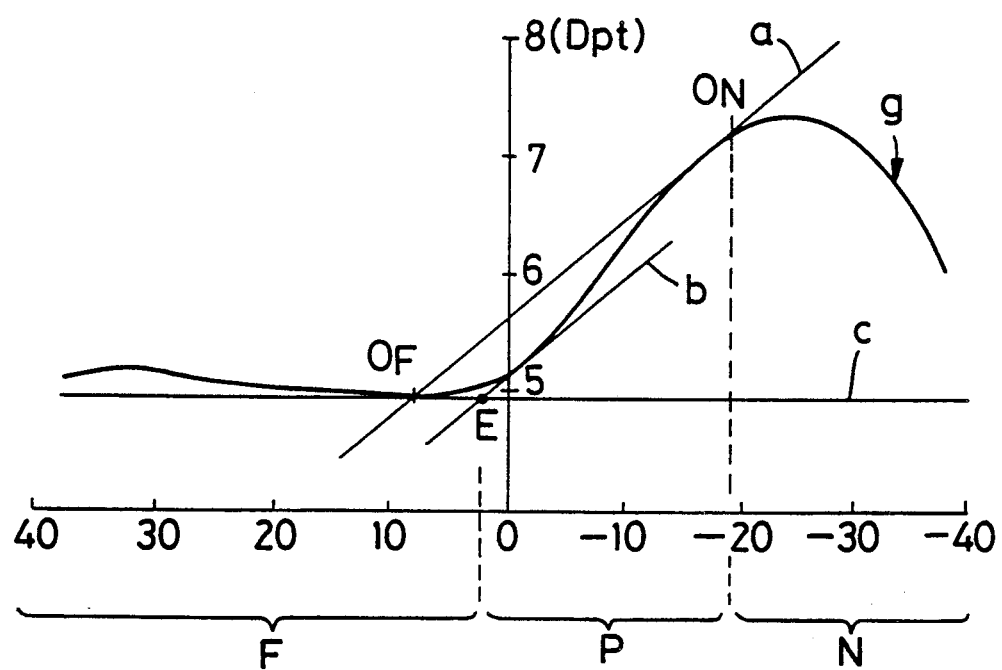
FIG. 7 is a graph showing additional power curves of the embodiment of the present invention.

The, refracting power distribution along the principal meridional curve as in the embodiment is shown in FIG. 7. In this embodiment, the ophthalmic lens having a progressively variable refracting power has an average refracting power of the portion F of 5.0 diopters and an additional power of 2.5 diopters. The refracting power of this lens at the center $O_F$ is about 5.0 diopters. The average refracting power at the center ON is about 7.5 diopters.

In this embodiment, as shown in FIG. 7, the refracting power distribution curve (additional power curve g) along the principal meridional curve is maximum on the intermediate portion P side of the portion N on the principal meridional curve and is decreased toward the periphery of the portion N along the principal meridional curve. This lens has a refracting power distribution given such that the refracting power is increased toward the peripheral portion of the portion F and is decreased at its edge.

In design of the lens surface having the additional power curve g, the surface shape is not designed or evaluated within the circular area of the lens. A rectangular shape (FIG. 3) including the circular shape of the lens surface is assumed to design and evaluate the surface shape within the rectangular shape on the basis of the distribution shown in FIG. 6. Therefore, the curved surface in a large area which covers the circular shape of the lens can be optimized to obtain a shape of a practically smooth lens surface.

Figure 8:
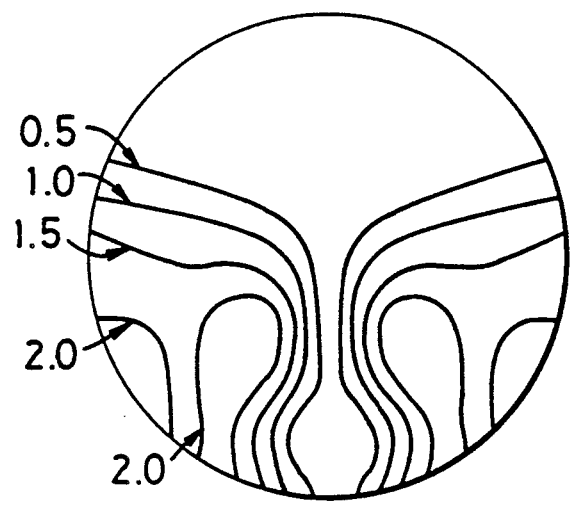
FIG. 8 is an isoastigmatic difference diagram of the embodiment of the present invention.
Figure 9:
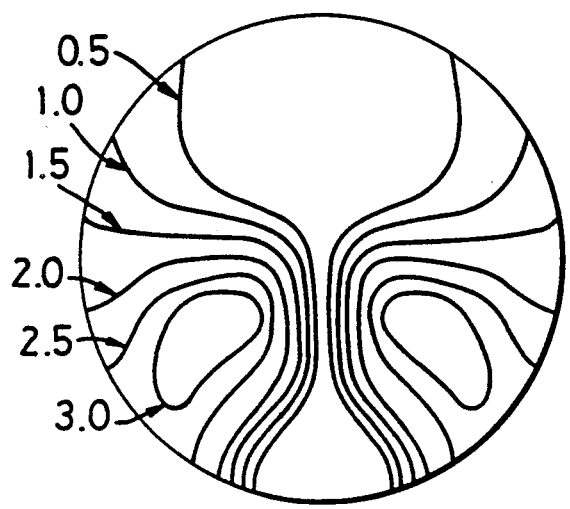
FIG. 9 is an isoastigmatic difference diagram of the prior art lens.

Performance of the ophthalmic lens having a progressively variable refracting power and the surface shape described above is evaluated, and results are shown in the astigmatic difference diagram of FIG. 8. The isoastigmatic difference lines in FIG. 8 are plotted in units of 0.5 diopters. As a comparison with this embodiment, isoastigmatic difference lines of a conventional ophthalmic lens having a progressively variable refracting power are shown in FIG. 9. These isoastigmatic difference lines are obtained in units of 0.5 diopters.

Since the conventional ophthalmic lens having a progressively variable focal power does not have the above arrangement of the present invention, an astigmatic difference density is increased, and the astigmatic difference values and the gradient of the astigmatic differences are increased, as shown in FIG. 9. As a result, image distortion is undesirably increased, and the user may feel image shift when he or she moves lines of sight. Aberration by the astigmatic difference from the side area of the intermediate portion adversely affects side areas at a lower position in the portion F of each lens. When eyes are directed toward these areas, image distortion and shift in addition to blurring typically occur in these areas.

To the contrary, in this embodiment, the astigmatic difference density of the surface refracting powers is decreased, the gradient of the astigmatic differences is moderate, and image distortion and shift are apparently suppressed, as shown in FIG. 8.

The major points of the ophthalmic lens having a progressively variable refracting power according to the present invention will be described with reference to FIG. 7 which shows the additional power curve g of this embodiment.

The center $O_F$ is located on the principal meridional curve having a predetermined average refracting power in the portion F and serves as the measuring reference point for the portion F in practice. The center $O_N$ is located on the principal meridional curve having a predetermined refracting power at the portion N and serves as the measuring reference point for the portion N in practice. The eye point E for the portion F serves as a reference point when lenses are fitted in a frame. The eye point E serves as a distance vision correction reference point which coincides with a distance vision correction position where the line of sight passes when the user wears lenses. The position of the eye point E is determined independently of the geometric center (FIG. 2A) of the lens, as indicated by the average refracting power distribution curve on the principal meridional curve in FIG. 7. The eye point E is defined as follows. That is, a straight line b which is tangent to a portion F side of the additional power curve g and parallel to a straight line a which connects the center $O_F$ of the portion F and the center $O_N$ of the portion N crosses a straight line c representing an average refracting power at the center $O_F$ to form an intersection. This intersection is defined as the distance vision correction eye point. In this case, the additional power curve g as shown in FIG. 7 is obtained by plotting the average of the surface refracting powers of the respective points on the principal meridional curve.

In general, since ophthalmic lenses having a progressively variable refracting power are worked to match the frame, the sizes of the respective areas, i.e., the portions F, P, and N, and especially the sizes of the areas of the portions F and N including the peripheral portions vary depending on shapes of frames. However, before working of the ophthalmic lens having a progressively variable refracting power, it is a circular lens having a diameter of about 60 mm or more. The circular lenses are delivered to retail shops and are worked to match desired frame sizes at the retail shops. Therefore, the surface shape of the ophthalmic lens having a progressively variable refracting power according to the present invention is defined as a shape prior to working. In design of an optimal surface shape of the ophthalmic lens having a progressively variable refracting power, it is important to balance aberration in consideration of the surface shape in a larger area including an effective area to be used in addition to the central area which is frequently used.

Conventional ophthalmic lenses having a progressively variable refracting power have a surface shape with a so-called umbilical line in which microscopically spherical surfaces continue along the entire principal meridional curve, and a surface shape which is not umbilical in part of the principal meridional curve, but in which two radii of curvature perpendicular to each other are different in this part of the curve. In other words, surface shapes on the principal meridional curve are classified into two shapes, i.e., a surface shape which is umbilical along the entire principal meridional curve; and a surface shape which is not umbilical on at least part of the principal meridional curve, but in which a radius of curvature along the principal meridional curve is different from that in a direction perpendicular to the principal meridional curve. The present invention is effective in both surface shapes.

In addition, conditions (1) and (2) are valid for an entirely umbilical surface shape on the principal meridional curve, or a surface shape including a portion which is not umbilical.

According to the present invention, there is provided an ophthalmic lens having a progressively variable refracting power, in which a wide field of view can be assured at a lower position in the portion for distance vision, the intermediate portion and the portion for near vision have wide bright fields which can be sufficient in practice, image distortion and shift in the peripheral areas of the intermediate portion and the portion for near vision can be minimized, a good aberrational balance can be obtained, and the user who wears this lens for the first time will not feel discomfort.

According to the present invention, there is provided an ophthalmic lens having a progressively variable refracting power, in which the curvature of the lens surface is not monotonous but a moderate refracting power gradient within allowable ranges of the above conditions is provided, thereby minimizing the astigmatic difference throughout the refracting surface of the lens. The maximum value of the astigmatic difference can be minimized, and its gradient can be moderate so that the aberration density in the aberration concentration area in the side areas of the principal meridional curve from the lower position in the portion for distance vision to the portion for near vision is reduced, image shift and distortion of the areas of the intermediate portion and the portion for near vision can be suppressed, and the user who wears the lenses of this type for the first time will not experience discomfort. In addition, a design standard for improving the visual characteristics can be established on the basis of the parameters of the present invention. Therefore, the design standard is very useful as a reference for evaluating characteristics of the lens.

What is claimed is:

1. An ophthalmic lens having a progressively variable refracting power, including:

a distance vision correction portion located at an upper portion of the lens along a predetermined principal meridional curve and having a refracting power for a far scene;

a near vision correction portion located at a lower portion of the lens and having a refracting power corresponding to a near scene; and an intermediate portion defined between said distance vision and near vision correction portions and having a progressively variable refracting power for continuously connecting the refracting powers of said distance vision and near vision correction portions, wherein a cross-sectional shape of a refracting surface in said distance vision correction portion is defined by a noncircular curve at an upper position in said distance vision correction portion given such that a value of a horizontal radius of curvature is increased and then decreased as the upper position in said distance vision correction portion is separated from an intersection with the principal meridional curve along a cross-sectional intersection line, a noncircular curve at a lower position in said distance vision correction portion given such that a value of a horizontal radius of curvature is decreased and then increased as the lower position in said distance vision correction portion is separated from an intersection with the principal meridional curve along the cross-sectional intersection line, and a circular curve at a central position in said distance vision correction portion given such that a value of a horizontal radius of curvature is kept substantially constant.

2. A lens according to claim 1, wherein a cross-sectional shape of the refracting surface of said intermediate portion is constituted by a noncircular curve at an upper position of said intermediate portion given such that a value of a horizontal radius of curvature is substantially constant and then increased as the upper position of said intermediate portion is separated from the intersection with the principal meridional curve along the cross-sectional intersection line, and a noncircular curve at a central position of said intermediate portion given such that a value of a horizontal radius of curvature is increased and then decreased as the central position of said intermediate portion is separated from the intersection with the principal meridional curve along the cross-sectional intersection curve and that a rate of increase and a rate of decrease are increased toward said near vision correction portion.

3. A lens according to claim 1, wherein a cross-sectional shape of the refracting surface of said near vision correction portion is formed by a noncircular curve at upper and lower positions in said near vision correction portion given such that values of horizontal radii of curvature are increased and then decreased as the upper and lower positions in said near vision correction portions are separated from the intersection with the principal meridional curve along the cross-sectional intersection line.

4. A lens according to claim 1, wherein a cross-sectional shape of the refracting surface of said intermediate portion is formed by a noncircular curve at a central position of said intermediate portion given such that a value of a horizontal radius of curvature is increased and then decreased as the central position of said intermediate portion is separated from the intersection with the principal meridional curve along the cross-sectional intersection line and that a rate of increase and a rate of decrease are increased toward said near vision correction portion, and a cross-sectional shape of the refracting surface of said near vision correction portion is formed by a noncircular curve given such that a value of a horizontal radius of curvature at a given position is increased and then decreased as the given position ia separated from the intersection with the principal meridional curve along the cross-sectional intersection curve.

5. A lens according to claim 1, wherein cross-sectional shapes of the refracting surface of said intermediate portion and said near vision correction portion are formed by a noncircular curve given such that a value of a horizontal radius of curvature at a given position in each of said intermediate and near vision correction portions is increased and then decreased as the given position is separated from the intersection with the principal meridional curve along the cross-sectional intersection line, and a position where a direction of change in horizontal radius of curvature is changed from an increase to a decrease falls within a range vertically separated from the principal meridional curve by W/4 to 3W4 where W is a radius of the lens.

6. An ophthalmic lens having a progressively variable refracting power, including:

a distance vision correction portion located at an upper portion of the lens along a predetermined principal meridional curve and having a refracting power for a far scene;

a near vision correction portion located at a lower portion of the lens and having a refracting power corresponding to a near scene; and an intermediate portion defined between said distance vision and near vision correction portions and having a progressively variable refracting power for continuously connecting the refracting powers of said distance vision and near vision correction portions;

wherein if a radius of said lens is defined as W and an additional power thereof is defined as A (diopter), a surface refracting power of an area vertically separated from the principal meridional curve by at least W/3 near at least a central position of said near vision correction portion of a refracting surface extending from said intermediate portion and said near vision correction portion falls within a range of $\pm A/2$ diopters along a direction of a cross section of the refracting surface.

7. An ophthalmic lens having a progressively variable refracting power, including:

a distance vision correction portion located at an upper portion of the lens along a predetermined principal meridional curve and having a refracting power for a far scene;

a near vision correction portion located at a lower portion of the lens and having a refracting power corresponding to a near scene; and an intermediate portion defined between said distance vision and near vision correction portions and having a progressively variable refracting power for continuously connecting the refracting powers of said distance vision and near vision correction portions, wherein a longitudinally sectional shape of a refracting surface in said distance vision correction portion is defined by a noncircular shape at an upper position in said distance vision correction portion given such that a value of a vertical radius of curvature is increased and then decreased as the upper position in said distance vision correction portion is separated from an intersection with the principal meridional curve along a cross-sectional intersection line, is defined such that a value of a vertical radius of a curvature at a lower position in said distance vision correction portion is decreased as the lower position in said distance vision correction portion is separated from an intersection with the principal meridional curve along the cross-sectional intersection line, and is defined such that a value of a vertical radius of curvature at a central position in said distance vision correction portion is kept substantially constant.

8. A lens according to claim 7, wherein a cross-sectional shape of the refracting surface of said intermediate portion is defined such that a value of a vertical radius of curvature at an upper position of said intermediate portion is decreased as the upper position of said intermediate portion is separated from the intersection with the principal cross-sectional intersection line along the cross-sectional intersection line, that a value of a vertical radius of curvature at a lower position of said intermediate portion is increased as the lower position of said intermediate portion is separated from the intersection with the principal meridional curve along the cross-sectional intersection curve, that a value of a vertical radius of curvature at a substantially central position of said intermediate portion is increased and then kept substantially constant as the central position of said intermediate portion is separated from the intersection with the principal meridional curve along the cross-sectional intersection line.

9. A lens according to claim 7, wherein a cross-sectional shape of the refracting surface of said near vision correction portion is defined such that a value of a vertical radius of curvature at a given position in said near vision correction portion is increased and then kept constant as the given position is separated from the intersection with the principal meridional curve along the cross-sectional intersection line, and a position where a direction of change in vertical radius of curvature is changed from an increase to a decrease falls within a range vertically separated from the principal meridional curve by W/4 to 3W/4 where W is a radius of the lens.

10. An ophthalmic lens having a progressively variable refracting power, including:
a distance vision correction portion located at an upper portion of the lens along a predetermined principal meridional curve and having a refracting power for a far scene;
a near vision correction portion located at a lower portion of the lens and having a refracting power corresponding to a near scene; and
an intermediate portion defined between said distance vision and near vision correction portions and having a progressively variable refracting power for continuously connecting the refracting powers of said distance vision and near vision correction portions,
wherein in an area which extends from said intermediate portion as a side portion of the principal meridional curve to the lower position in said near vision correction portion and in which a substantially central portion having a surface refracting power astigmatic difference of less than 0.5 diopter and included in the progressively variable refracting power area can be used as an area of clear vision vertically extending in the lens along the principal meridional curve, said lens has a curved surface such that a difference $\Delta q$ between an average surface refracting power Q and a value G obtained by multiplying a square root of the Gaussian curvature with a refracting power satisfies the following condition:

$$A_D^2/(500(P_B + 1)) \leq |\Delta q| \leq A_D^2/(3P_B + 4A_D)$$

for $\Delta q = Q - G$ $$G = (n - 1)\sqrt{K}$$

where
$A_D$: an additional power (diopter)
$P_B$: a reference average refractive index in said distance vision correction portion
K: the Gaussian curvature.

11. A lens according to claim 10, wherein said lens has a curved surface such that, the difference $\Delta q$ between the average surface refracting power Q and the value G obtained by multiplying the square root of the Gaussian curvature with a refracting power satisfies the following condition when a lens aperture diameter is 50 mm with respect to a geometric center of said lens:

$$A_D^2/(500(P_B + 1)) \leq |\Delta q| \leq 2A_D^2/3(3P_B + 4A_D)$$

for $$\Delta q = Q - G$$
$$G = (n - 1)\sqrt{K}$$

where
$A_D$: the additional power (diopter)
$P_B$: the reference average refractive index in said distance vision correction portion
K: the Gaussian curvature.

12. An ophthalmic lens having a progressively variable refracting power, including:
a distance vision correction portion located at an upper portion of the lens along a predetermined principal meridional curve and having a refracting power for a far scene;
a near vision correction portion located at a lower portion of the lens and having a refracting power corresponding to a near scene; and
an intermediate portion defined between said distance vision and near vision correction portions and having a progressively variable refracting power for continuously connecting the refracting powers of said distance vision and near vision correction portions;
wherein a shape of a refracting surface in said distance vision correction portion is defined by a nonspherical surface at an upper position in said distance vision correction portion given such that values of horizontal and vertical radii of curvature are increased and then decreased as the upper position in said distance vision correction portion is separated from an intersection with the principal meridional curve along a cross-sectional intersection line, a nonspherical surface at a lower position of said distance vision correction portion given such that a value of a horizontal radius of curvature is decreased and then increased and a value of a vertical radius of curvature thereat is decreased and then kept substantially constant as the lower position of said distance vision correction portion is separated from the intersection with the principal meridional curve along the cross-sectional intersection line, and a substantially spherical curve at a substantially central position in said distance vision correction portion given such that horizontal and vertical radii of curvatures are kept substantially constant.

13. A lens according to claim 12, wherein a shape of the refracting surface in said intermediate portion is defined by a nonspherical surface at an upper position in said intermediate portion given such that a value of a vertical radius of curvature is decreased as the upper position in said intermediate portion is separated from the intersection with the principal meridional curve along a cross-sectional intersection line, and a nonspherical surface near a central position of said intermediate portion given such that a value of a horizontal radius of curvature is increased and then decreased as the central position of said intermediate portion is separated from the intersection with the principal meridional curve along the cross-sectional intersection line and that a rate of increase and a rate of decrease are increased toward the near vision correction portion.

14. A lens according to claim 12, wherein a shape of the refracting surface in said near vision correction portion is defined by a nonspherical surface given such that a value of a horizontal radius of curvature at an upper position in said near vision correction portion is increased and then decreased as the upper position in said near vision correction portion is separated from the intersection with the principal meridional curve along the cross-sectional intersection line and a vertical radius of curvature thereat is increased and then kept constant as the upper position in said near vision correction portion is separated from the intersection with the principal meridional curve, and that a horizontal radius of curvature at a lower position in said near vision correction portion is increased and then decreased as the lower position in said near vision correction portion is separated from the intersection with the principal meridional curve.

* * * * *